Nov. 21, 1967 A. E. SEED ET AL Re. 26,302

LOAD CELL APPARATUS

Original Filed July 11, 1960 5 Sheets-Sheet 1

INVENTORS
ANIESE E. SEED
FRANK E. GOLDING
BY Marshall & Wilson
ATTORNEYS

LOAD CELL APPARATUS

Original Filed July 11, 1960 5 Sheets-Sheet 2

INVENTORS
ANIESE E. SEED
FRANK E. GOLDING
BY
Marshall & Wilson
ATTORNEYS

INVENTORS
ANIESE E. SEED
FRANK E. GOLDING
BY
Marshall & Wilson
ATTORNEYS

LOAD CELL APPARATUS

Original Filed July 11, 1960 5 Sheets-Sheet 4

INVENTORS
ANIESE E. SEED
FRANK E. GOLDING
BY
Marshall & Wilson
ATTORNEYS

LOAD CELL APPARATUS

Original Filed July 11, 1960 5 Sheets-Sheet 5

INVENTORS
ANIESE E. SEED
FRANK E. GOLDING
BY
Marshall + Wilson
ATTORNEYS

United States Patent Office

Re. 26,302
Reissued Nov. 21, 1967

26,302
LOAD CELL APPARATUS

Aniese E. Seed and Frankie Golding, Toledo, Ohio, assignors to Toledo Scale Corporation, Toledo, Ohio, a corporation of Ohio Original No. 3,136,157, dated June 9, 1964, Ser. No. 42,955, July 11, 1960. Application for reissue Mar. 23, 1967, Ser. No. 639,918
11 Claims. (Cl. 73—141)

Matter enclosed in heavy brackets [ ] appears in the original patent but forms no part of this reissue specification; matter printed in italics indicates the additions made by reissue.

*ABSTRACT OF THE DISCLOSURE*

*The disclosure describes a load cell comprising a base, a displaceable member which is movable relative to the base and a strain gage sensing apparatus for measuring the displacement of the member with respect to the base. Two flexible diaphragms are provided which are exposed to ambient pressure, one of which extends between the member and the base and the other of which defines a sealed space with the base and the first diaphragm and which is coupled to the member. The diaphragms eliminate the effect of atmospheric pressure changes and eliminate the effect of temperature induced internal gas pressure changes within the sealed space.*

This invention relates generally to load weighing devices and in particular to load cells of the type which are utilized in conjunction with various strain gage devices to determine the magnitude of a load applied to the load cell.

Load cells are utilized in many different fields where load forces are to be measured or masses are to be weighed. Load cells in conjunction with strain gage devices find particular application in permanent installations in which the load cells are so located that it is impossible or very difficult to provide maintenance for the load weighing devices. In most applications it is impossible to center a load directly over one load cell so that a plurality of the load cells must be used to support and measure a particular load. An outstanding example of this is a load weighing device for trucks. If it is impossible to center the load over one load cell then the off-center loading or torque loading of a load cell and how it reacts thereto is very important.

In still other applications load cells are used to measure loads which transmit rotational torque to the load cell. For example, the screw-down screw of a rolling mill applies a rotational torque to the measuring load cell, creating torque strains within the cell in the load sensitive area.

In still further applications it is necessary to have a load cell that will not be stressed out of its linear response range when an overload is applied thereto. The physical size of a load cell is important in that a standard line of load cells of a particular geometry may perform well at one size while another size responds inefficiently to an applied load.

Whether load cells of the above type are utilized in locations that make it difficult or impossible to service or in ordinary applications it is desirable to seal the load cell within a container. This prevents corrosive ambient atmospheric attacks on the apparatus, prevent· the intrusion of foreign objects into the cell which may interfere with any mechanical operation therein, and otherwise protects strain gages, wiring, etc. Heretofore such sealing has been accomplished, for example, by the use of a single diaphragm element which was placed over an open end of a housing in which a strain gage bearing element, that receives loads to be measured, had been inserted. This approach, as others, in sealing the unit in a container while solving the contamination problems above discussed has introduced other problems. The sealing of the container by prior methods necessarily meant that ambient pressure and temperature changes varied the pressure within the sealed cell which, in turn, caused a variance in the output from the cell. This varience in output was usually electrically compensated for, involving individual attention to each cell thereby adding labor and material costs as well as additional calibration after installation in a particular application.

It has further been found that shock loads create a zero shift in the initial load direction. If the load cell has overload protection in the form of a physical stop, rebound from the physical stop will cause a zero shift in the opposite direction. As shock values increase, the load direction output is not greatly affected however the rebound direction output increases until a permanent physical set in the load responsive member results causing a large zero change and an increase in the overload distance to the physical stop.

Accordingly, it is an object of this invention to provide an improved load cell which is efficient at all sizes, the cost of which is small, which effectively resists undesired rotational torque forces, and which balances off-center loading.

It is a further object of this invention to provide a load cell device which may be formed from one piece of stock thereby providing a low mechanical hysteresis, which has positive overload stops at the load points and for the load receiving means, has mounting surfaces for strain gage devices on which the stress is uniform, mounting surfaces from which both positive and negative stresses may be obtained, and mounting surfaces may be had, if desired, in which all of the strain gages are on one surface. If the strain gages are applied to one surface the geometry of the load cell of this invention makes it easy to trim all of said strain gages at once.

It is a still further object of this invention to provide improved load cell apparatus in which a plurality of diaphragms are used to eliminate the effect of atmospheric pressure changes and eliminate the effect of temperature induced internal gas or other fluid pressure changes and thus the need for electrically compensating for same. Further, the diaphragms are advantageously utilized to improve lateral stability of the load responsive member within a housing as well as reducing erroneous outputs from lateral or off-center loading and avoiding contamination of the apparatus.

In addition, it is an object of this invention to provide load cell apparatus in which overload protection is supplied as well as rebound protection for shock loading.

In accordance with the above objects it is a feature of this invention to provide a load cell comprising an annulus having a plurality of legs depending therefrom to support the annulus. Load receiving means having a cylindrical form for a portion of its length and a rounded load button on its upper extremity plus a tapered portion at its lower extremity is coupled to the annulus by a spider having a plurality of radial legs. In the preferred form of the invention there are a like plurality of dependent and radial legs, all of the legs engaging the under surface of the annulus at spaced intervals. The radial legs of the spider are spaced intermediate the dependent legs. A second annulus may be attached to the dependent legs to provide a base support for the dependent legs and the first mentioned annulus.

The entire structure may be formed or machined from a single piece of stock thereby reducing undesirable hysteresis characteristics in the load cell. Each of the junctions of the under surface of said first-mentioned annulus with each of the legs, whether dependent or radial, may be formed in the shape of a fillet or concavity of a predetermined radius thereby making a mounting surface on the upper surface of the first-mentioned annulus for strain gage devices more sensitive and a more uniform stress area. The load receiving means tapers in diameter at its lower extremity so that with high side loads or off-center loads the load receiving means is operative not to bottom on any base support means or overload stop means before a full load capacity of the load cell is reached. The rounded button area on the upper extremity of the load receiving means tends to balance off-center loads. The radial legs of the spider and the lower extremity of the load receiving means are operative to bottom on a base support upon the occurrence of an overload before any lasting deformity of the load cell occurs.

Mounting surfaces for strain gage devices or other load sensitive devices are preferably provided on the upper surface of the first-mentioned annulus. However, mounting surfaces may be utilized on the upper and/or lower surfaces of the radial legs of the spider. The mounting surfaces on the upper surface of the first-mentioned annulus are preferably directly above each of the plurality of spaced dependent and radial legs attached to the under surface of the annulus. Thus, compressive and tensile stresses are available in adjacent sectors of the upper surface of the annulus.

When encapsulating the entire apparatus it has been found that two diaphragms may be utilized without increasing the height. Further, although particularly adapted for use with the load responsive members disclosed and described herein, it has been found that by securing diaphragms to the load receiving means rather than the load responsive member that the entire apparatus may be encapsulated without pre-loading the load cell. Also, by securing the diaphragms to the load receiving means alone changes in ambient pressures and temperatures cannot effect a loading on the load responsive means. Thus, in the preferred embodiment of the invention encapsulating diaphragms are connected to the upper and lower portions of the cylindrical load receiving means. This also enables enclosure of fragile strain gages and protection for all elements within the cell.

A rebound stop for the embodiments of the invention shown herein may be fashioned by forming a removably secured extension to the overload means on the lower extremity of the load receiving means. The removably securable extension may be formed with a flange which is operative to effect a positive stop against rebound by contact with a flange receiving surface formed on the underside of the base support or housing means. This same base support or housing means may be also operative to provide a grounding surface or positive stop for the lower extremity of the load receiving means which is acting as an overload stop means.

Other objects and advantages will become apparent to those skilled in the art from the following description when taken in conjunction with the accompanying drawings in which.

Figure 1:
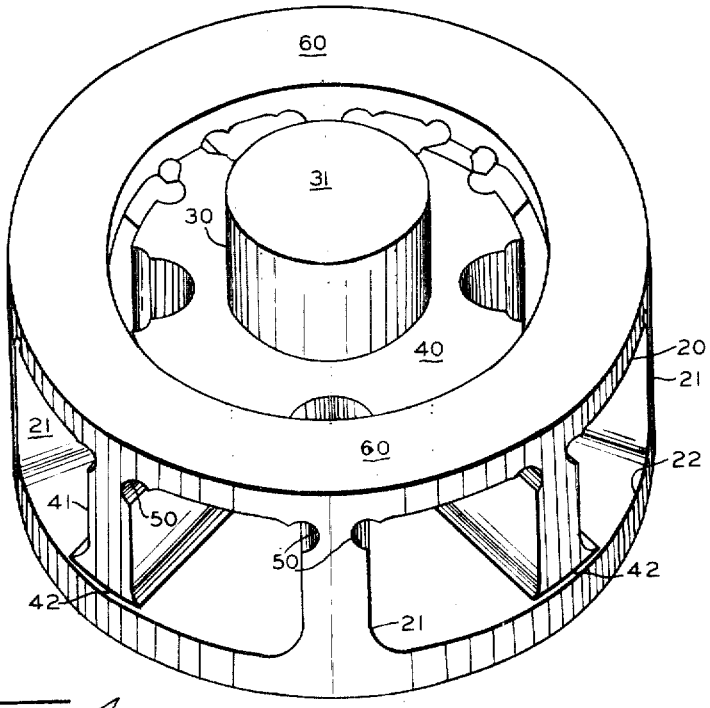
FIG. 1 is a view in perspective of a load responsive element according to the teachings of this invention.

Referring to FIGS. 1 through 4 there is shown a load cell comprising an annulus 20 having a plurality of legs 21 depending therefrom to support the annulus 20. The dependent legs 21 may be attached to a second annulus 22 which functions as a base support for the load cell. A cylinder 30 is utilized as a load receiving means. The upper extremity 31 of the load receiving means 30 is rounded to balance loads which are applied off-center of the load receiving means 30. As may be best seen in FIGS. 3 and 4 the lower extremity of the load receiving means 30 is tapered at 32 to prevent the load receiving means 30 from grounding on any base support or base means when high side loads are applied to the load receiving means 30 before the load cell reaches its full capacity.

The load receiving means 30 is attached or coupled to the annulus 20 by a plurality of radial legs 41 which are coupled to the under surface of the annulus 20 at spaced intervals intermediate the dependent legs 21. The legs 21 depending from the annulus 20 and the radial legs 41 have fillets or concavities 50 of small radii at the junction of the dependent and radial legs and the under surface of the annulus 20. Mounting surfaces 60 are provided on the upper surface of the annulus 20 for strain gage devices 61 over each of the like plurality of radial and dependent legs 21 and 41.

Figure 4:
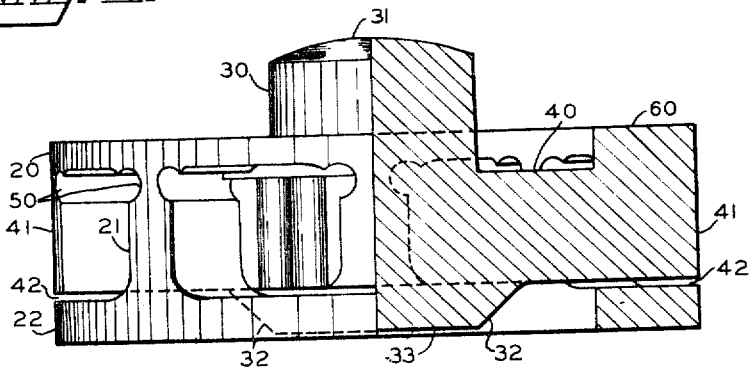
FIG. 4 is a front view of FIG. 2 with a section taken at lines 4—4 of FIG. 2.
Figure 3:
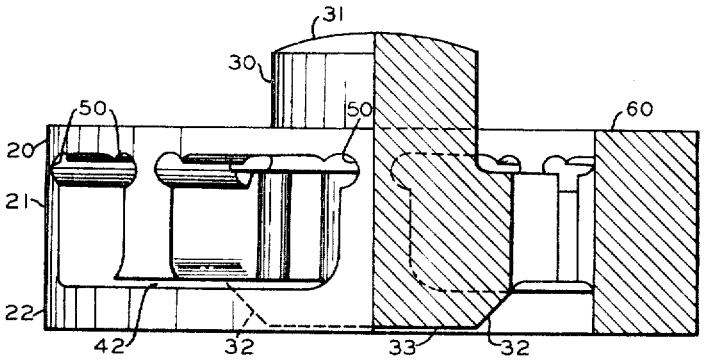
FIG. 3 is a front view of FIG. 2 with a section taken at lines 3—3 of FIG. 2.

As may be best seen in FIGS. 3 and 4 a small space 42 is provided between the radial legs 41 and the base annulus 22. A small space 33 is also provided between the lower extremity of the load receiving means 30 and any base means that may be provided below the lower annulus 22. These spaces are provided to allow vertical movement of the load receiving means 30 when receiving a load force on the load button 31. It may be desirable to make the space 33 between the load receiving means 30 and a base below the second annulus 22 a smaller space than the space 42 between the radial legs 41 and the second annulus 22. This is to insure that the load receiving means 30 will bottom slightly before the radial legs 41 and thus will take most of the effects of an overload to prevent deformity of the spring annulus 20 by the bottoming of the radial legs 41 on the second annulus 22.

When a load force is applied axially to the load button 31 the load receiving means 30 through the spider 40 will transmit this axial load through the radial legs 41 to the annulus 20. A compressive load on the load button 31 will cause the mounting surfaces 60 above the radial legs 41 to be under a compressive stress. The adjacent sectors 60 on the upper surface of the annulus 20 above the dependent legs 21 will thus be under a tensile stress. The gages 61 shown in FIG. 2 may then be connected into a bridge circuit (not shown) which, when having current applied thereto, will provide an output signal of a magnitude proportional to the load force applied to the load receiving button 31. It is to be noted that although the load cell as shown in the two embodiments of this invention is set up to measure compressive load forces only that the same structure may be utilized to measure tensile load forces by a modification of the load receiving means 30 and the supporting annulus 22.

The use of spring material for the upper annulus 20 with cooperating attached dependent legs 21 and radial legs 41 of the spider 40 plus the fillets or concavities 50 on the under surface of the upper annulus 20 provides mounting surfaces 60 which are maximum stress areas.

Figure 2:
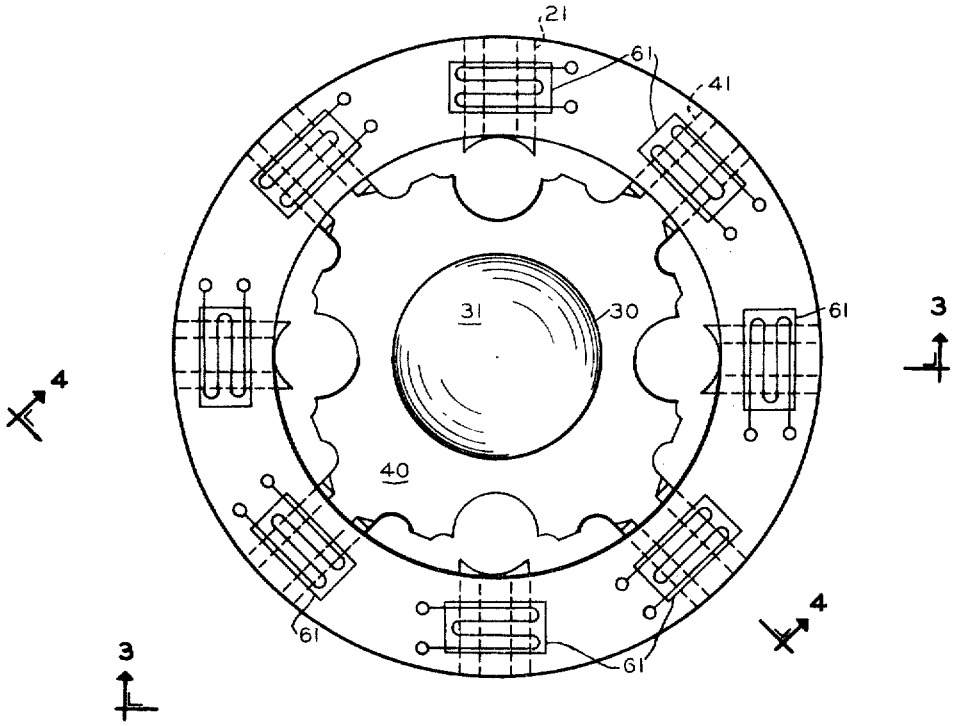
FIG. 2 is a plan view of FIG. 1.

Further, the stress over each of the dependent and radial legs is uniform and will be measured uniformly if the strain gages 61 are centered above the legs 21 and 41. The adjacent sectors of the upper annulus 20 provide positive and negative stresses in response to a load force on the load receiving means 30. The cooperation of the rounded load button 31 and the coupling effect of the spider 40 tends to reduce undesirable loading effects resulting from a load force which also has a rotational torque. As particularly clearly shown in the plan view of FIG. 2 and the further views in FIGS. 3 and 4 the load cell may be formed or machined from one piece of stock thereby reducing undersirable mechanical hysteresis effects. If desired, the strain gages 61 may all be mounted upon the same piece of backing material or etched thereon thus allowing all of the plurality of strain gages 61 to be mounted on the mounting surfaces 60 at the same time. If, when mounted as a unit, the strain gages 61 are not centered exactly over each of the radial and dependent legs 41 and 21 the output from a measuring bridge circuit utilizing the strain gages 61 will not be appreciably affected since the off-center mounting of each strain gage will be the same and the individual errors will tend to compensate out in the complete bridge circuit. Further, with the gages mounted as shown in FIG. 2 it is easier to trim all of the gages at once. The physical size of the load cell has little effect on the linearity of the spring forming the upper annulus 20 and on the linearity of the output signal obtained from a measurement circuit utilizing the strain gages 61.

If desired, it is possible to place strain gages on the upper and lower surfaces of the radial legs 41. This would provide mounting surfaces for the same number of gages 61 as are shown at 60 on FIG. 1. Half of the gages so mounted on the radial legs 41 would provide a positive stress while the remaining half would provide negative stress.

Figure 5:
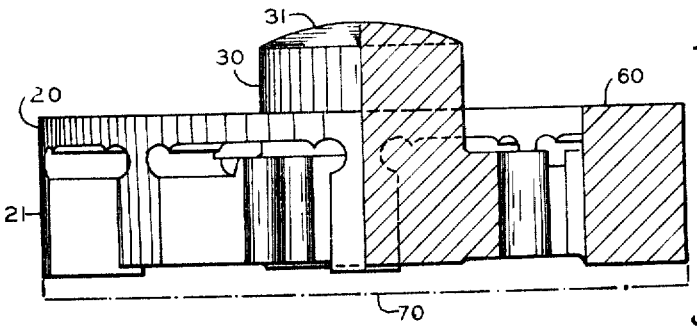
FIG. 5 is a front view of a second load responsive element according to the teachings of this invention.

Referring to FIG. 5 there is shown a load cell which provides a second embodiment of this invention. The load cell of FIG. 5 is very similar in all respects to the load cells shown in FIGS. 1 through 4 with the exception that the lower annulus 22 has been deleted from its attached position to the dependent legs 21 and the load receiving means 30 has been shortened in length so that the dependent legs 21 may rest directly on any type of a base means 70 which may be of a circular or square plate type or other configuration which is suitable. The only requirement for the base means 70 is that it provides a level seating area for each of the dependent legs 21 and bottoming areas intermediate the legs 21 and in the center to receive the radial legs 41 and the load receiving means 30 when the load cell of FIG. 5 is overloaded. In all other aspects the load cell of FIG. 5 is similar in construction and identical in function to the load cell shown in FIGS. 1 through 4 in that it provides the same advantages at the same mounting surfaces. The configuration of FIG. 5 is not a self-contained piece of apparatus as is FIG. 1, however, the geometry of FIG. 5 lends itself more readily to casting the entire load cell if so desired. It is to be noted that while the load cells shown in FIGS. 1 through 5 may be machined from a single piece of stock or cast or formed by other means that the load cell may be constructed from the above individual enumerated parts. For example, the upper annulus 20 could have the dependent legs and radial legs 41 and 21 welded or otherwise attached thereto, etc.

Figure 6:
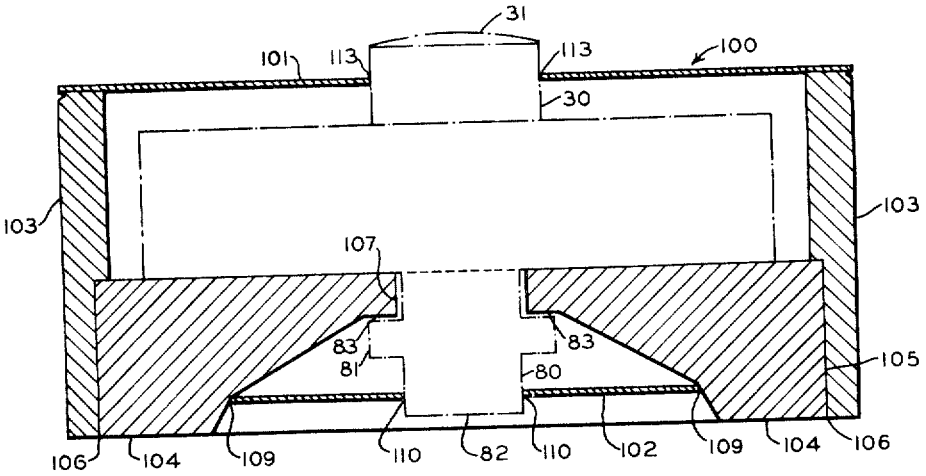
FIG. 6 is a cross-sectional view of an assembled encapsulated compression load cell according to the teachings of this invention.

Referring to FIG. 6 there is shown a cross-sectional view of an encapsulated compression type load cell designated generally at 100. A load receiving means 30 and the remainder of the load cell spring element, of the type shown in FIGS. 1 through 4, is shown outlined in phantom within the housing. The walls 103 of the housing may be, for example, a cylindrical seamless steel tube having formed therein a counter bore 105 to receive a base means 104 of the housing. The base means 104 may be secured to the wall means 103 by threading the respective parts so that the base means 104 screws into the counter sunk portion 105 of the walls 103, or the base means 104 may be welded or soldered around the circumference of the junction of the wall 103 and base 104 denoted in the cross section as 106.

The base means 104 of the housing may have formed in the center thereof an aperture 107. An extension 80 of the load receiving means 30 may be inserted through the aperture 107 of the base means 104 and secured, as by male and female threads, to the load receiving means 30. As noted herein in other embodiments of this invention the securing of the extension 80 of the load receiving means 30 will not interfere with the positive overload bottoming stop of the load receiving means 30 against the base means 104. A lower sealing diaphragm 102 may be attached to the base means 104 at 109 by welding, soldering, copper brazing, etc., or any other suitable means which is effective to seal the interior of the encapsulated cell from the atmosphere. To complete this seal the diaphragm 102 is also attached to the extension 80 of the load receiving means 30, again by welding, soldering etc., which is effective to exclude the atmosphere from entrance within the encapsulated cell. The diaphragm 102 of FIG. 6 may be a circular flat plate having an aperture formed therein to receive the lower extension 80 of the load receiving means 30. Therefore, the weld appearing at points 109 would be a circular weld extending around the circumference of the diaphragm 102, while the weld at points 110 would be a circular weld extending around the circumference of the aperture receiving the lower extension 80 of the load receiving means 30.

Similarly, an upper diaphragm 101 may be a circular plate having an aperture formed therein to receive the load receiving means 30. The upper diaphragm 101 is secured to the housing walls 103 by welding, soldering, etc., around the outer circumference of the diaphragm. The circumference of the hole formed in the diaphragm 101 to receive the load receiving means 30 may be welded at 113. The cell is now sealed from exterior contamination. Entrance to wire the strain gage bridge on the load cell spring element shown in phantom in FIG. 6 may be gained through a glass to metal seal element which will be shown in greater detail in a later embodiment. Although not shown in FIG. 6 such a glass to metal seal element may be utilized here. In the arrangement shown in FIG. 6, the load receiving means 30 constitutes a displaceable member which is movable relative to the base means 104, and the extension 80 constitutes a strut which couples the load receiving means 30 to the diaphragm 102 and which extends from the load receiving means 30 in the direction in which the load receiving means is movable relative to the base means 104.

It has been found that shock loads create a zero shift in the initial load direction. If the load cell has overload protection in the form of a physical stop as described hereinbefore for the load cell spring elements shown in FIGS. 1 to 5, rebound from the physical stop as the result of a shock overload will cause a zero shift in the opposite direction. As shock values increase, the load direction output from a bridge circuit of the strain gages, utilized with the load cell spring elements, is not greatly affected, however the rebound direction output increases until a permanent physical set in the load responsive member results causing a large zero change and an increase in the overload distance to the physical stop.

To remedy this a rebound stop for the compression load cell shown in FIG. 4 has been fashioned by forming the removably secured extension 80 to the load receiving means 30 and thus also to the overload means on the lower extremity of the load receiving means 30. The removably secured extension 80 is formed with a flange 81 which is operative to effect a positive stop against rebound by contact with a flange receiving surface 83 formed on the underside of the base support 104 of the housing shown in FIG. 6. The base support 104 of the housing shown in FIG. 6 is also operative on its upper surface to provide a grounding surface or positive stop for the lower extremity of the load receiving means 30 which is acting as a positive overload stop means for the load cell spring element shown in phantom in FIG. 6.

Thus, it may be seen that there is illustrated in FIG. 6 a simple encapsulated load cell unit which is operative to use two diaphragms to prevent contamination of the interior of the cell. The load cell spring element is sealed within the container preventing corrosive ambient atmospheric attacks on the apparatus, preventing the instrusion of foreign objects into the cell which may interfere with the mechanical operation therein (such as the intrusion of objects under the overload stop means) and otherwise protecting the fragile strain gages, wiring, etc. Such sealing heretofore has been accomplished, for example, by the use of a single diaphragm element which was placed over an open end of a housing in which a strain gage bearing element or load cell spring has been inserted. This approach, as others, in sealing the unit in the container, while solving the contamination problems above discussed, introduced other problems. The sealing of the container by prior methods necessarily meant that ambient pressure and temperature changes varied the pressure within the sealed cell which, in turn, caused a variance in the output from a cell. This variance in output was caused by the fact that the upper diaphragm need be attached to or bearing against the load receiving means 30 of the load cell spring unit. Thus, when the pressure of the gas, or other fluid, within the cell increased the load receiving means 30 was moved, or was allowed to move, upwards creating a shift from the zero load position. Similarly, when the gas fluid pressure within the cell decreased the diaphragm moved downward causing a preload in the load cell spring unit in the opposite direction. Such pressure changes resulted from the effect of atmospheric pressure changes, and also from the effect of temperature induced internal gas pressure change due to ambient temperature changes. It is possible to electrically compensate for most of the temperature induced internal gas pressure change. However, such compensation involved individual attention to each cell produced thereby adding labor and material costs as well as additional calibration after installation at a particular application. No satisfactory method has been thus far found to eliminate the effect of atmospheric pressure changes on the load cell's zero load output.

In the encapsulated load cell shown in FIG. 6 the use of two diaphragms has eliminated the zero shift loading of the load cell spring unit thereby eliminating the effect of atmospheric pressure change and the effect of temperature induced internal gas pressure change. This is accomplished by attaching both the upper and lower diaphgrams to the central load receiving means as at welds or solder points 113 and 110. This means that any change whether atmospheric or temperature induced in the pressure within the cell is operative only to exert a force on the central load receiving means. Since the load receiving means itself only is being squeezed and not the surfaces bearing the strain gage elements, the output from the load cell is not affected. The purpose of the arrangement shown in FIG. 6 is to cause the upward force applied to the extension 80 by the pressure of the outside atmosphere to be substantially equal to the downward force applied to the load button 31 by the pressure of the atmosphere. This result will be achieved if the effective area of the diaphragm 102, including the end of the extension 80, is substantially equal to the effective area of the diaphragm 101 and load button 31. The effective area of the diaphragm 102 may be increased somewhat by the fact that bending of the metal of the welded joint at 109 may occur. On the other hand the effective area of the diaphragm 101 may be diminished somewhat by the fact that the outer margin of the diaphragm 101 is rigidly supported on the top of the wall 103 so that downward flexing of the diaphragm is effected solely by bending of the diaphragm itself. When downward flexing of the diaphragm 101 occurs, the effective line of flexure is spaced inward somewhat from the inner edge of the wall 103, so as to reduce the effective area of the diaphragm. Further, the use of upper and lower diaphragms joined to the load receiving means at the upper and lower portion of the cell contributes greatly to lateral stability of the load receiving means and greatly reduces off center or side loading effects. The particular geometry of the load cell spring units described herein advantageously allows the use of two diaphragms without increasing the height of the complete cell. However, such use of two diaphragms is not limited to the combinations shown herein.

It is to be noted that the simple compression load cell of FIG. 6 may be converted to a universal load cell which measures both compression and tension loads by tapping a hole at 82 in the extension 80 attached to the load receiving means 30. Thus, a load coupling element may be received by a threaded hole at 82 in the lower extension 80 of the load receiving element 30 such that a tension load will cause a deflection in the load cell spring unit as described hereinbefore. All protections, both encapsulation by sealing and overload protection whether direct overload or shock rebound overload, are provided when the cell shown in FIG. 6 is utilized either as a compression or as a tension measuring unit.

Figure 7:
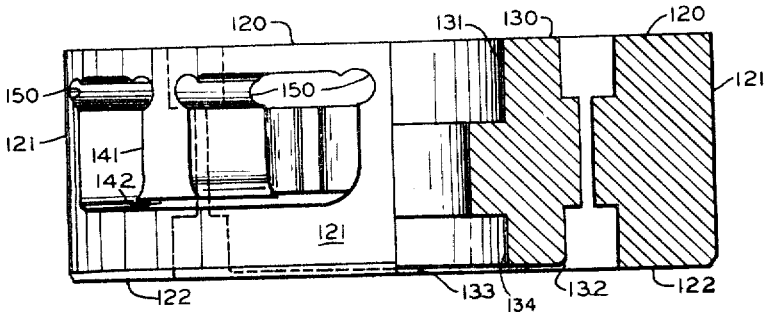
FIG. 7 is a side view, partly in section, of a third load responsive element particularly adapted for use in a tension load cell.

Referring to FIG. 7 there is shown a side view with a quarter-section removed, of a third load responsive element or load cell spring element which is particularly adapted for use in a tension load cell. Since the load cell spring element of FIG. 7 is similar to the load cells shown in FIGS. 1 to 5, it is believed that only a side view with a cut away section need be shown to describe the geometry and function.

The load cell of FIG. 7 comprises an annulus 120 having a plurality of legs 121 depending therefrom to support the annulus 120. The dependent legs 121 may be attached to a second annulus 122 which functions as a base support for the load cell and as a means for anchoring the load cell spring element within a housing if desired. A hollow cylindrical center column 130 is utilized as a load receiving means. The upper extremity of the load receiving means 130 has been counterbored at 131 to receive a lock nut member which will be hereinafter described in connection with the description of the complete encapsulated tension load cell. The lower extremity of the cylindrical load receiving means 130 is tapered at 132 to prevent the load receiving means 130 from grounding on any base support or base means when high side loads are applied to the load receiving means 130 before the load cell reaches its full capacity. The lower extremity of the hollow cylindrical load receiving means 130 has also been counterbored at 134 to receive a tension stud to be described.

The load receiving means 130 is coupled to the annulus 120 by a plurality of radial legs 141 which are coupled to the under surface of the annulus 120 at spaced intervals intermediate the dependent legs 121. The legs 121 depending from the annulus 120 and the radial legs 141 have fillets or concavities 150 of small radii at the junction of the dependent and radial legs and the under surface of the annulus 120. Mounting surfaces are provided on the upper surface of the annulus 120 for strain gage devices over each of the like plurality of radial and dependent legs 121 and 141 in a manner similar to that shown in FIG. 2 hereinbefore.

A small space 142 is provided between the radial legs 141 and the base annulus 122. A small space 133 is also provided between the lower extremity of the load receiving means 130 and a base or housing means into which the load cell spring unit is to be inserted. These spaces are provided to allow vertical movement of the load receiving means 30 when receiving a load force applied through means to be shown to the load receiving means 30 when this load cell spring unit is utilized in a tension cell. It may be desirable to make the space 133 between the load receiving means 130 and a base or housing below the second annulus 122 a smaller space than the space 142 between the radial legs 141 and the second annulus 122. This is to insure that the load receiving means 30 will bottom slightly before the radial legs 141 and thus will take most of the effects of an overload to prevent deformity of the spring annulus 120 by the bottoming of the radial legs 141 on the second annulus 122.

When a load force is applied axially to the load receiving means 130 the axial load will be transmitted through the radial legs 141, attached to the load receiving means 130, to the annulus 120. A load on the load receiving means 130 will cause the mounting surfaces above the radial legs 141 to be under a compressive stress. The adjacent sectors on the upper surface of the annulus 120 above the dependent legs 121 will thus be under a tensile stress. Strain gages applied as described hereinbefore to the upper surface may then be connected into a bridge circuit (not shown) which, when having current applied thereto, will provide an output signal of a magnitude proportional to the load force applied to the load receiving means 130. It is to be noted that although the load cell spring shown in FIG. 7 is particularly adapted to measure tensile load forces that the same structure may be utilized with modifications to measure compressive load forces by a modification of a load receiving means 130 to form a load receiving button such as described hereinbefore.

The use of spring material for the upper annulus 120 with cooperating attached dependent legs 121 and radial legs 141 plus the fillets or concavities 50 on the under surface of the upper annulus 120 provides mounting surfaces directly above all legs which are maximum stress areas. Further, the stress over each of the dependent and radial legs is uniform and will be measured uniformly if the strain gages are centered above the legs 121 and 141. The adjacent sectors of the upper annulus 120 just described provide positive and negative stresses in response to a load force on the load receiving means 130. The load cell spring element shown in FIG. 7 may be formed or machined from one piece stock thereby reducing undesirable mechanical hysteresis effects. As hereinbefore, if desired the strain gages may all be mounted upon the same piece of backing material or etched thereon thus allowing all of the plurality of strain gages to be mounted on the mounting surface of the upper annulus 120 at the same time. If, when mounted as a unit, the strain gages are not centered exactly over each of the radial and dependent legs 141 and 121, the output from the measuring bridge circuit utilizing the strain gages will not be appreciably affected since the off center mounting of each strain gage will be the same and the individual errors will tend to compensate out in the complete bridge circuit. Further, with the gages mounted on the upper surface of the annulus 120 it is easier to trim all of the gages at once. Also as stated hereinbefore, the physical size of this load cell has little effect on the linearity of the spring forming the upper annulus 120 and on the linearity of the output signal obtained from a measurement circuit utilizing strain gages placed upon the annulus 120.

Figure 8:
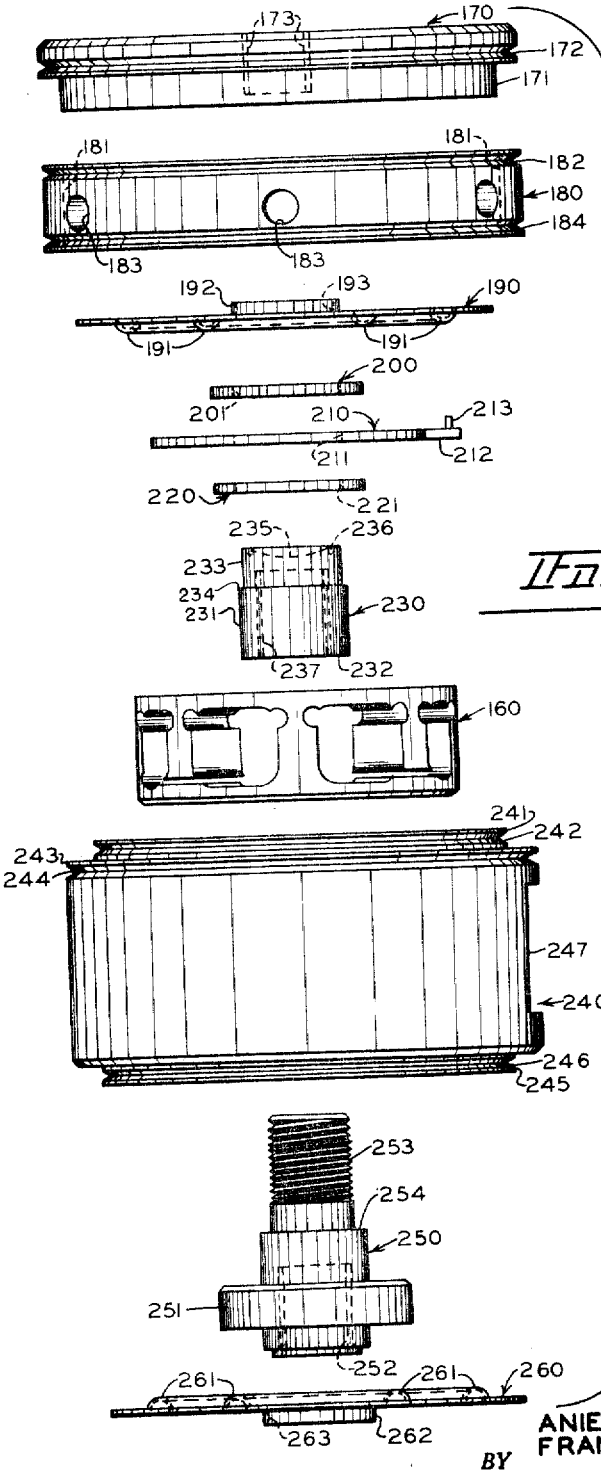
FIG. 8 is an exploded view of a complete tension load cell.

Referring to FIG. 8 there is shown an exploded view of the components of a tension load cell utilizing the spring unit illustrated in FIG. 7. For the purposes of clarity the exploded view showing the component parts in FIG. 8 may be compared with the cross-sectional view of the assembled tension load cell shown in FIG. 9 and the subassembly shown in FIG. 10.

Figure 9:
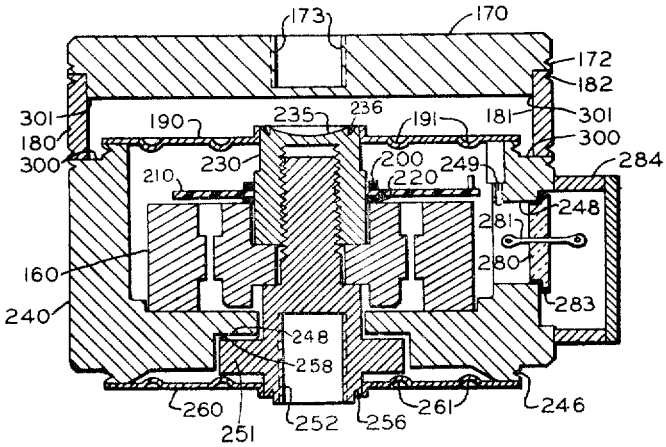
FIG. 9 is a cross-sectional view of the assembled tension load cell of FIG. 8.

The tension load cell shown in FIGS. 8 and 9 comprises a housing 240 for receiving the load cell spring element 160. After the load cell spring element 160 has been inserted within the housing 240 a tension stud 250 is inserted up through the base of the housing 240 and through the hollow cylindrical load receiving means 130. The load cell spring element 160 may be bolted, cemented, or otherwise held in place in the housing by any suitable means. A lock nut 230 engages threads 253 on the tension stud 250 with female threads 237 in the interior of the lock nut 230. The lock nut 230 is tightened in place by use of the screw driver slot 235 so that the base 232 of the top lock nut bears against the bottom of the upper counterbore 131 of the load receiving means 130. When the tension stud 250 is pulled upward by the action of the threads the shoulder 254 of the tension stud 250 is tightened against the bottom counterbore 134 in the load receiving means 130 of the spring 160, such that the top lock nut and the tension stud have gripped the load receiving means 130 preventing movement of either the tension stud or the lock nut with respect to the load receiving means 130.

Since the load cell spring unit 160 was inserted within the housing 240 and secured, the supporting legs 121 and the spring unit 160 are in a fixed position with respect to the housing. When the tension stud 250 and the lock nut 230 are assembled with the spring unit there is provided the space 133 between the load receiving means 130 of the load cell spring unit 160 and the base of the housing 240 to act as a positive overload stop as described hereinbefore. A flange 251 is formed on the tension stud 250 such that after the lock nut and tension stud are tightened into place a space 258 appears between the flange 251 and a flange grounding surface 248 on the lower side of the base of the housing. This provides a positive stop for shock load rebound as discussed hereinbefore for the compression load cell of FIG. 6. As may be seen the tension stud 250 is provided with a threaded hole 252 in which a coupling for tension loads may be inserted and held in place.

A lower sealing diaphragm 260 having an aperture 263 and a welding collar 262 centrally located therein is fitted over the lower end of the tension stud 250 and up against the base of the housing 240. The diaphragm 260 has formed therein circular corrugations 261. The circular corrugations 261 in the diaphragm 260 make the diaphragm stiffer and more resistant to external shocks. Further, the corrugations 261 allow the diaphragm 260 to travel with the movement of the load receiving means 130 and the tension stud 250 such that the travel will be linear and not interfere with the measurement of the force being applied as being recorded by the strain gages on the load cell spring unit 160. It will be noted that a circumferential groove 256 around the lower portion of tension stud 250 is adapted such that the welding collar 262 of the diaphragm 260 fits adjacent thereto. The outer rim of the groove 256 is welded to the collar 262 of the diaphragm 260. The purpose of the groove 256 is to prevent heat from dissipating from the area of the weld thereby providing a fast welding time and a better finished weld. Similarly the circumferential groove 246 on the indented lower extension 245 of the housing 240 serves to prevent heat from being dissipated when the outer rim of the diaphragm 260 is being welded to the indented lower extension 245 of the housing. Both the welds at 245 and at 256 are preferably airtight to exclude the atmosphere from the interior of the load cell. With the assembly of the diaphragm 260 with the lower portion of the tension stud 250 the bottom half of the housing 240 is completely sealed. The provision of an indented lower extension 245 allows the use of a protective collar (not shown) added to the housing to protect the diaphragm and tension coupling means.

It is to be noted that the use of two diaphragms, above and below the load cell spring unit described herein, is operative to provide more distance between the diaphragms. Thus, more moment is available to resist off-center loading which would normally tend to distort the output from the load cell.

After the lower diaphragm 260 has been welded in place the next step in the assembly of the tension load cell is the placing of washer 220 around the lower portion 231 of the top lock nut 230. The washer 220 has formed therein a hole 221 large enough to provide a slip fit over the lower wider portion 231 of the lock nut 230. The washer 220 is wide enough to rest on the load receiving means 130 to prevent its further travel downward. A circular terminal board 210 is next put in place and supported on top of the washer 220 around the lower portion 231 of the lock nut 230. On top of the printed circuit terminal board 210 is placed a collar 200. The collar 200 has formed therein a hole 201 which is just large enough to allow a press fit on the lower portion 231 of the lock nut 230. After the collar 200 is pressed into place the shoulders 234 of the lower portion of the lock nut 230 are peened over thereby securing the collar, terminal board, and washer assembly in place in a fixed position. The terminal board 210 is positioned on the lower portion 231 of the lock nut 230 such that a tongue extension 212 is opposite an aperture 248 drilled in the side of housing 240. As best seen in FIG. 9 a slot 249 is formed in the housing just above the hole 248 such that wire lead connections running from the printed circuit terminal board 210 may be secured to a peg 213 attached to the tongue extension 212 of the terminal board 210. The leads are passed up through the slot 249, secured to the peg 213, and then dispersed to the various terminals of the bridge circuit formed by the connection of the strain gages disposed on the load responsive surface of the spring element 160 to the printed circuit pattern on the terminal board 210.

Access to the interior of the housing is obtained by protruding terminals through a glass to metal seal element 280 which is soldered in place at 283 in the hole 248 drilled in the housing 240. The soldering of the glass to metal seal element 280 at 283 should be completely airtight preventing passage of gases or fluid. Although only one metallic terminal 281 is shown in the illustrated glass to metal seal element 280 it is to be recognized that there are usually a plurality of such terminals available for making connections with wiring inside the encapsulated cell. To further protect the leads and the terminals 281 on the exterior of the housing there may be copper brazed or otherwise secured to the housing a terminal box 284. The terminal box 284 may or may not have a removable lid or plate at the side through which access to the leads may be gained. As a final further protection against vibration, moisture, etc., the terminal box 284 may be filled with an epoxy or other potting material and allowed to set after the final connections are made. Access for input and output leads to the terminal box 284 may be had through a water proof screw plug assembly (not shown) which excludes moisture and otherwise seals the interior of the terminal box 284 while providing access to a multi-lead cable.

The upper diaphragm 190 is now placed such that the aperture 193 formed in the center of the diaphragm fits over the upper portion of the lock nut 230. A welding collar 192 is provided on the diaphragm 190 around the aperture 193 for welding the diaphragm 190 to the top of the lock nut 230. As was provided with the tension stud 250 a circumferential groove 236 around the outside circumference of the lock nut 230 assists in providing a better weld between the collar 192 of the diaphragm 190 and the lock nut 230. Similarly, a circumferential groove 242 around the indented upper extension 241 of the housing 240 provides a better weld for the rim of the upper diaphragm 190 to the upper extension 241 of the housing 240. When the welds are completed around the rim of the diaphragm 190 and between the collar 192 of the diaphragm and the lock nut 230, the cell shown in FIG. 9 is now completely encapsulated preventing any contamination of the apparatus on the interior of the housing.

To provide a means for anchoring the cell when it is used as a tension measuring device a hollow cylindrical anchoring ring 180 is attached by welding, soldering, etc., to the upper portion of the housing 240 as best shown in FIG. 9. The cylindrical wall of the ring 180 has provided therein a plurality of apertures 183 which are disposed along the lower portion of the wall to allow a complete drainage of any moisture that is collected on the diaphragm 190 and to prevent the entrapment under pressure of any gas after an anchoring cap 170 is placed on top of the ring 180. The anchoring cap 170 is provided with an indented lower extension 171 that fits within the cylindrical ring 180 as best seen in FIG. 9. The housing support ring 180 and the cap 170 are welded together along the external perimetrical junction, as best seen in FIG. 9. Again, grooves 182 and 172 are provided to assist in attaining the best weld available. Here, as before, the grooves prevent the dissipation of heat from the weld being made. The cap 170 is provided with a tapped hole 173 in which a threaded member may be inserted and the threaded member then may be suitably anchored such that a tension load may be placed on the tension stud 250 at the bottom of the completed cell.

The space 300 shown in FIG. 9 between the upper extension 241 of the housing 240 and the inner surface 181 of the ring 180 is filled with an epoxy or other suitable water proof material which prevents moisture from seeping in behind the weld between the housing 240 and the ring 180. Similarly, the assembly of the cap 170 and the ring 180 is accomplished after the interior of both have been painted and while the paint is still wet, such that the paint from the lower extension 171 will combine with the paint on the inner wall 181 of the ring 180 to form a fillet at 301 thereby protecting the rear of weld between the cap 170 and the ring 180.

Figure 10:
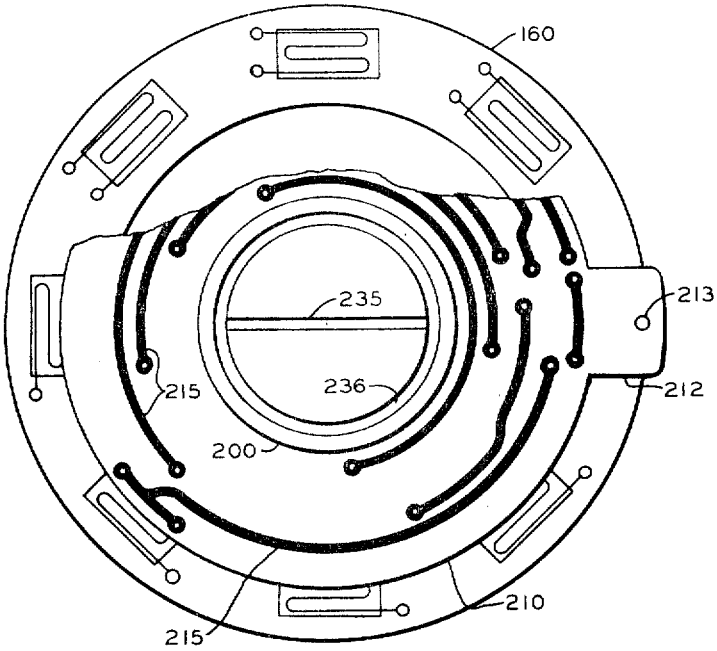
FIG. 10 is a plan view of the load responsive element of FIG. 9 assembled with a load receiving means and a circuit connecting means.

Referring to FIG. 10 there is shown a sub-assembly of the load cell spring element 160, the terminal printed circuit board 210, the holding collar 200, and the upper portion of the lock nut 230 in a plan view. As may be seen from the drawing the printed circuit board 210 has etched or otherwise provided thereon conductive circuits 215 which are operative to connect the various strain gage elements into a desired bridge circuit when wires are connected between the lead tabs of the strain gage elements and the various printed circuit etchings 215. The use of the printed circuit terminal board 210 enables the use of shorter wires, a reduction of resistance between connections, the prevention of accidental disposition of the wires to interfere with the mechanical operation of the load cell spring element, and a generally cleaner, faster assembly of the strain gage elements into an electrical bridge circuit with provision for securing the leads from the bridge circuit against vibratory effects to the peg 213 disposed on the tongue extension 212 of the printed circuit board 210. A portion of the board 210 has been cut away to show the relative disposition of the strain gage elements on the upper surface of the upper annulus 120 of the load cell spring element 160.

Thus, we have disclosed load cell apparatus in this application which comprises in general load responsive means, load receiving means coupled to said load responsive means, housing means supporting said load responsive means, and encapsulating means enclosing said load responsive means within said housing including means attached to the load receiving means and the housing means. The preferred embodiment of the load responsive means which is most advantageously utilized in this invention comprises an annulus supported by a plurality of dependent legs. The load receiving means is shown in various forms but usually comprises a central column which is coupled to the load responsive means by a plurality of radial legs. In the load cell particularly adapted for use in measuring tension forces the load receiving means comprises a hollow cylindrical central column, a tension stud for insertion up through the hollow cylindrical column, and a lock nut for securing the tension stud in place.

The housing means shown herein varies but generically includes base means for supporting the load responsive means and wall means. The base means usually has an aperture formed therein such that a lower extremity of the load receiving means, such as the tension stud, extends therethrough. The extension of the load receiving means through the base means allows the connection of diaphragm means between the housing walls and the load receiving means below the base means. Another diaphragm is connected to the load receiving means and to the housing walls above the base means such that the connection of the two diaphragms seals the load responsive means within the housing. The diaphragms may be made of any suitable metallic material and have generally concentric circular corrugations formed therein to improve the linearity and to resist lateral displacement of the load receiving means. Besides the diaphragm means the encapsulating means further includes a glass-to-metal seal element having terminals extending therethrough and adapted to be secured in an aperture advantageously formed in the housing walls.

In conclusion, it is pointed out that while the illustrated examples constitute practical embodiments of our invention, we do not limit ourselves to the exact details shown since modification of the same may be made without departing from the spirit and scope of this invention.

Having described the invention, we claim:

1. A *load cell* [sensing instrument] comprising a base, a displaceable member which is movable relative to the base, a sensing apparatus for measuring the displacement of said member with respect to the base, a flexible diaphragm *exposed to ambient pressure* extending between said member and the base, and a second flexible diaphragm *exposed to ambient pressure* which defines a sealed space with the base and the first diaphragm, and which is positively coupled to said member so as to cause one of said diaphragms to move outward with respect to such space when the other moves inward, *the displaceable member including a first extension extending to the exterior of the sealed space and being responsive to applied loads to be measured and* the effective area of the second diaphragm being such that the force acting on said member which is caused by a change in the differential between the ambient pressure and the pressure inside such space is substantially counterbalanced by the force acting on the second diaphragm which is caused by such change in the differential, *thereby to eliminate the effects of said change in pressure differential on the sensing apparatus.*

2. A *load cell* [sensing instrument] as claimed in claim 1 wherein the second diaphragm is coupled to the displaceable member by means of a strut.

3. A *load cell* [sensing instrument] as claimed in claim 2 wherein the strut extends from the displaceable member in the direction in which the member is movable relative to the base.

4. A *load cell* [sensing instrument] as claimed in claim 1 wherein the base surrounds the displaceable member.

5. A *load cell* [sensing instrument] as claimed in claim 1 wherein the effective area of the displaceable member and its diaphragm is substantially equal to the effective area of the second diaphragm.

6. A *load cell* [sensing instrument] as claimed in claim 1 wherein the sensing apparatus is a resilient apparatus which is subject to strain upon movement of the displaceable member relative to the base and which is provided with an electrical strain gage for measuring such strain.

7. *A load cell according to claim 1 wherein the sensing apparatus includes an annulus having a plurality of dependent legs supported by the base.*

8. *A load cell according to claim 7 wherein the displaceable member includes a plurality of radial arms coupled to the annulus.*

9. *A load cell according to claim 1 wherein the displaceable member includes a central column coupled to the sensing apparatus.*

10. *A load cell according to claim 1 wherein the displaceable member includes a second extension coupled to the sensing apparatus.*

11. *A load cell according to claim 10 wherein the base defines an aperture through which the second extension extends.*

References Cited

The following references, cited by the Examiner, are of record in the patented file of this patent or the original patent.

UNITED STATES PATENTS

| | | | |
|---|---|---|---|
| 2,601,678 | 6/1952 | Beatty | 73—398 |
| 2,867,707 | 1/1959 | MacDonald | 73—88.5 XR |

FOREIGN PATENTS

| | | |
|---|---|---|
| 1,173,830 | 3/1959 | France. |
| 757,211 | 9/1956 | Great Britain. |

RICHARD C. QUEISSER, *Primary Examiner.*

C. A. RUEHL, *Assistant Examiner.*